(12) United States Patent
Chung

(10) Patent No.: US 6,226,502 B1
(45) Date of Patent: May 1, 2001

(54) APPARATUS AND METHOD FOR CONTROLLING A BASE STATION TRANSMITTED FORWARD POWER IN A MOBILE COMMUNICATIONS SYSTEM

(75) Inventor: Chae-Hun Chung, Kyoungki-do (KR)

(73) Assignee: Hyundai Electronics Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/220,231

(22) Filed: Dec. 23, 1998

(30) Foreign Application Priority Data

Dec. 27, 1997 (KR) .................................................. 97-75510

(51) Int. Cl.[7] .................................................. H04Q 7/32
(52) U.S. Cl. .................................................. 455/118; 455/127
(58) Field of Search .................................................. 455/118, 117, 455/13.4, 20, 24, 68, 69, 71, 125, 522, 127, 572, 574, 88, 232, 249.1

(56) References Cited

U.S. PATENT DOCUMENTS

| | | | |
|---|---|---|---|
| 4,790,000 | * 12/1988 | Kinoshita | 455/449 |
| 5,438,683 | * 8/1995 | Durtler et al. | 455/74 |
| 5,457,811 | * 10/1995 | Lemson | 455/67.1 |
| 5,513,386 | 4/1996 | Ogino et al. | |
| 5,726,981 | 3/1998 | Ylitervo et al. | |
| 5,737,695 | 4/1998 | Lagerqvist et al. | |
| 5,862,461 | * 1/1999 | Yoshizawa et al. | 455/127 |
| 5,995,853 | * 11/1999 | Park | 455/574 |
| 6,023,612 | * 2/2000 | Harris et al. | 455/127 |
| 6,029,074 | * 2/2000 | Irvin | 455/571 |
| 6,031,828 | * 2/2000 | Koro et al. | 370/336 |

* cited by examiner

Primary Examiner—Dwayne Bost
Assistant Examiner—Jean A Gelin
(74) Attorney, Agent, or Firm—Reed Smith LLP

(57) ABSTRACT

A base station transmitted forward power is controlled in such a manner that identifies a mode of an input base station transmitted forward power control command; and controls an attenuation value of an attenuator in a power adjustment part according to a result of the identification so as to gradually increase or decrease a base station transmitted power, thereby effecting the base station transmitted forward power control without deterioration of speech quality and interruption of calls.

7 Claims, 6 Drawing Sheets

APPARATUS AND METHOD FOR CONTROLLING A BASE STATION TRANSMITTED FORWARD POWER IN A MOBILE COMMUNICATIONS SYSTEM

BACKGROUND OF THE INVENTION

1. Field of the Invention

The present invention relates to a mobile communication system and, more particularly, to an apparatus and method for controlling a base station transmitted forward power in a mobile communication system which controls a base station transmitted forward power without influencing users conversations over the phone by gradually increasing the power.

2. Description of Related Art

A mobile communication system is generally employed for mobile units such as human beings, automobiles, ships, trains, and aircraft and includes a personal communication system (PCS), a digital cellular system (DCS), and a digital trunked radio system (DTRS).

FIG. 1 is a block diagram of a base station in the general mobile communication system.

As shown in FIG. 1, the base station comprises: a digital modulating part 1 for receiving coded voice information or data information and performing channel coding, digital modulation, and band expansion; a digital/analog converting part 2 for converting digital signals produced from the digital modulating part 1 into analog signals of intermediate frequency (IF); a base station management part 3 for managing parameters used in the base station and performing state management and source loading; a base station control part 4 for transmitting the parameters from the base station management part to another block and performing state management and call processes of the base station; a radio frequency control part 5 for controlling up-conversion of the IF received from the base station control part 4; a frequency up-converting part 6 for converting the IF outputted from the digital/analog converting part 2 into ultra high frequency (UHF) according to the control of the radio frequency control part 5; a power amplifying part 7 for amplifying a power of the UHF outputted from the frequency up-converting part 6; and a transmitting part 8 for performing bandpass filtering with respect to the signal amplified at the power amplifying part 7 to transmit only the signals of a desired band.

In the conventional mobile communication system, once the base station having such configuration receives the coded voice information or the data information, it performs the channel coding, digital modulation, and band expansion with respect to the information and, in turn, converts the information into analog signals of an IF band. Subsequently, the base station up-converts the IF signals into high radio frequency signals, amplifies a power of the signals, and transmits only signals of a desired band through the transmitting part 8.

In the mobile communication system, to activate a base station (cell or sector) is to make the base station transmit a predetermined power level fixed in accordance with a coverage area designed for the relevant base station to allow a mobile station within the coverage area of the base station to be given services. This activation is required when a new base station is established or a base station has been inactivated for a test or due to accidents such as natural disasters (e.g., the strike of lightning).

According to conventional technology, a base station (cell or sector) is activated in such a manner that it is made to instantly transmit a power having a predetermined strength fixed according to a coverage area of the base station. This instant transmission power causes a sudden increase of an overall forward link power, so a strong interference affects the forward link to a mobile station which is at a boundary between the relevant base station and an adjacent base station (cell or sector).

In other words, once a base station to be activated is started through a power on, the base station management part 3 in a base station adjacent to the base station to be activated controls the base station control part 4 to detect a base station activation command in accordance with the power on of the base station to be activated and the detected base station activation command is transmitted to the radio frequency control part 5. Subsequently, the radio frequency control part 5 controls such that the frequency of signals received from the digital/analog converting part 2 can be instantly up-converted according to the base station activation command transmitted from the base station control part 4. The power amplifying part 7, in turn, emanates the instantly amplified power to the coverage area, so that the power can be transmitted to mobile stations within the coverage area of the relevant base station which is adjacent to the activated base station.

At this time, the mobile stations are given the mobile communication services through forward traffic channels and the base station which has the mobile stations in its service area. The forward traffic channels for the mobile stations are interfered by the power which has been suddenly outputted from the adjacent activated base station. The base station adjacent the activated station then receives the interfered forward traffic channels of the mobile stations. Therefore, the sudden output of the power by the activation of a base station interferes the forward traffic channels of an adjacent base station covering the mobile stations, and the adjacent base station covering the mobile stations outputs an amplified power to its coverage area via the interfered forward traffic channels, thus deteriorating receive sensitivity of the mobile stations receiving the interfered power.

According to the conventional technology, in such case where the deterioration of the receive sensitivity is caused, a mobile station is allowed to receive the forward traffic channel where the interference is removed to a certain limit by increasing the power of a forward traffic channel of base station covering the mobile station, thereby improving speech quality.

However, there is a limit in such conventional method of controlling the forward power to solve the deterioration of performance of a link caused by the sudden and strong interference. The forward power control for the mobile station by the base station should be performed with an appropriate strength and at a right time. Otherwise, a pertinent call can be interrupted. For example, when a mobile station within the coverage area of a base station adjacent to a base station to be activated has a strong radio interference due to sudden output of a power of the base station to be activated, this significantly interferes with a normal forward traffic channel between the mobile station and its corresponding base station adjacent to the base station to be activated. In this case, the base station covering the mobile station and adjacent to the base station to be activated cannot receive the forward traffic channel of the mobile station, thereby disturbing the forward power control by the base station covering the mobile station, so the traffic channel between the mobile station and the base station covering the mobile station is interrupted.

The conventional technology which activates a base station (cell or sector) by making the base station to be activated instantly transmit a power of a predetermined strength has drawbacks of deteriorating speech quality of a mobile station and interrupting a call of the mobile station which is near a boundary in a service area of an adjacent base station (cell or sector).

To inactivate a base station is to cut off a transmission power of the base station, thus not allowing a mobile station in a coverage area of the base station to be given services. This inactivation is caused by a test for the base station or natural disasters such as the strike of lightning.

According to the conventional technology, the inactivation of a base station is effected by instantly interrupting a power transmitted from the base station. This instant interruption of the transmission power causes sudden reduction of a forward link power, so a strong interference affects a forward link of a mobile station near a boundary within a coverage area of an adjacent base station (cell or sector).

In other words, if the transmission power of a base station to be inactivated is instantly interrupted, a base station adjacent to the base station to be inactivated operates such that it can maintain forward traffic channels of mobile stations within its coverage area. The base station adjacent to the base station to be inactivated performs forward power control to instantly decrease the transmission power. As a result, a power strength of a forward traffic channel of a mobile station within the coverage area of the base station where the instant reduction of the transmission power occurs becomes to be changed.

When a transmission power strength of the base station adjacent to the base station to be inactivated exceeds a predetermined threshold, the mobile station within the coverage area of the adjacent base station cannot receive the transmission power from the relevant base station. Thus the relevant base station covering the mobile station which do not receive the transmission power cannot perform the forward power control, causing interruption of a call.

The conventional method of instantly cutting off a transmission power to inactivate a base station has a problem that a call made in a cell can be interrupted because the cell is suddenly inactivated.

SUMMARY OF THE INVENTION

Accordingly, the present invention is directed to an apparatus and method for controlling a base station transmitted forward power in a mobile communication system that substantially obviates one or more of the limitations and disadvantages of the related art.

An object of the present invention is to provide an apparatus and method for controlling a base station transmitted forward power, wherein a radio frequency control part controls an attenuation value of an attenuator in a power adjustment part to be gradually increased or decreased in a mobile communication system in use, thereby effectively performing forward power control of a base station without deterioration of speech quality of a mobile station in use or interruption of a call.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an apparatus for controlling a base station transmitted forward power includes: a radio frequency control part for controlling up-conversion of frequency and generating a control signal for adjustment of an attenuation value, the radio frequency control part having a memory for storing data of attenuation values of a power adjustment part; and a power adjustment part for adjusting a power amplification rate according to the attenuation adjustment control signal of the radio frequency control part and transmitting the data from the frequency up-converting part to a power amplifying part.

In another aspect, the present invention provides a method of controlling a base station transmitted forward power in a mobile communication system, wherein a base station transmitted forward power control mode is registered and an attenuation value of an attenuator in a power adjustment part is controlled according to a mode corresponding the received forward power control command to gradually increase or decrease the transmission power of the base station, thereby effecting the control of the base station transmitted forward power.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

The following is a detailed description on an embodiment based upon a technological idea of a method of controlling a base station transmitted forward power in a mobile communication system according to the present invention.

Primarily, three forward power control modes are reviewed. A base station activation mode is to make a base station first transmit a power of a certain strength fixed in accordance with a coverage area designed for the base station, thus allowing mobile stations within the coverage area of the base station to be given services. A base station partial activation mode is to transmit a power of a certain strength fixed to expand or change a coverage area when a relevant case station is activated and operates. A base station inactivation mode is to cut off transmission power of a base station, thus not allowing mobile stations within the coverage area of the base station to be given services.

Figure 1:
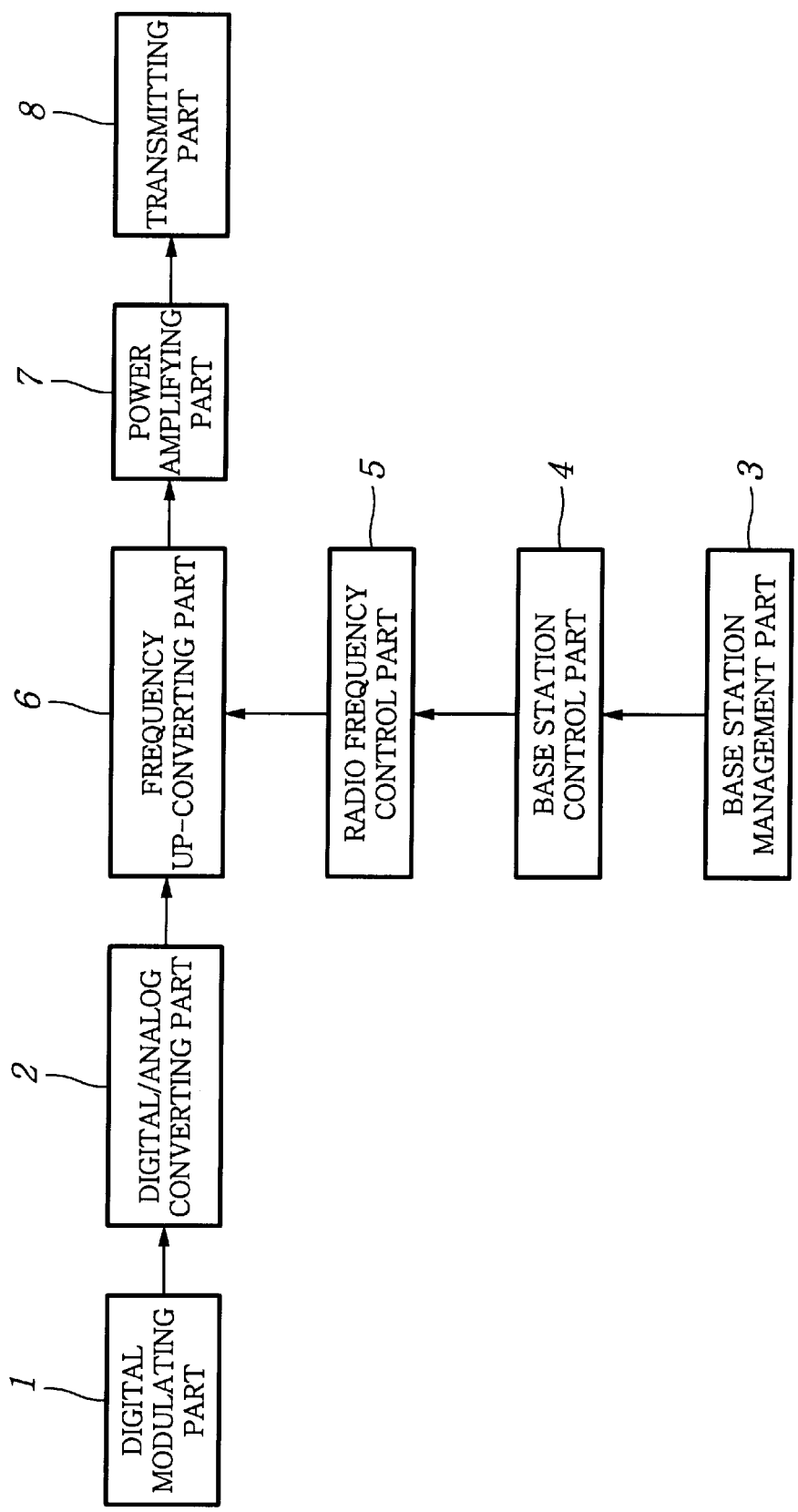
FIG. 1 is a block diagram of a conventional base station in a mobile communication system.
Figure 2:
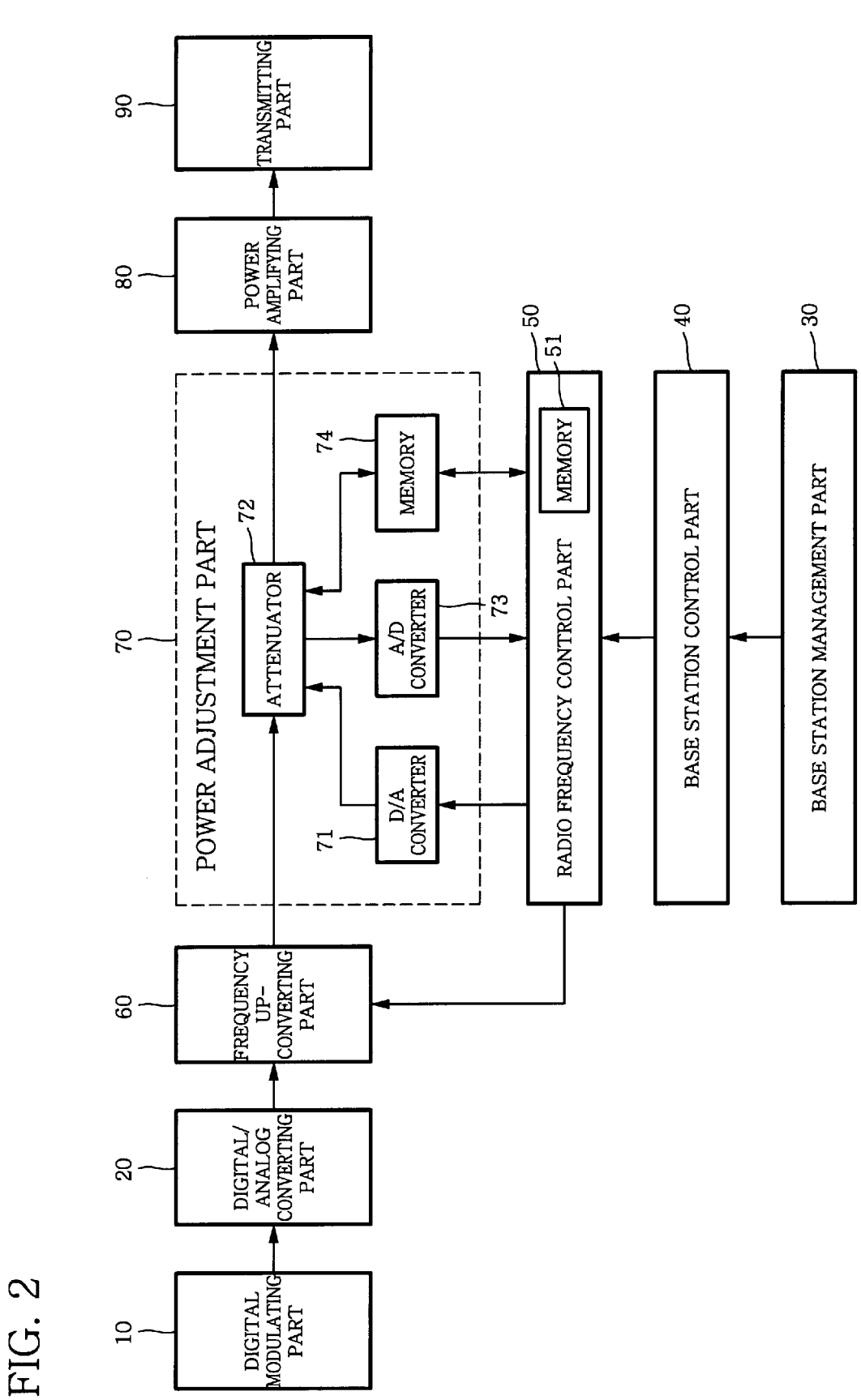
FIG. 2 is a block diagram of an apparatus for controlling a base station transmitted forward power in a mobile communication system according to the present invention.

FIG. 2 is a block diagram of an apparatus for controlling a base station transmitted forward power in a mobile communication system according to the present invention.

As shown in FIG. 2, the forward power controlling apparatus comprises: a digital modulating part 10 for receiving coded voice information or data information and performing channel coding, digital conversion, and band expansion; a digital/analog converting part 20 for converting digital signals produced from the digital modulating part 10 into analog signals of intermediate frequency (IF); a base station management part 30 for managing parameters used in a base station and performing state management and source loading; a base station control part 40 for transmitting the parameters from the base station management part to another block and performing state management and call processes of a base station; a radio frequency control part 50 for controlling up-conversion of the IF received from the station control part 40 and generating a control signal for adjustment of an attenuation value, the radio frequency control part 50 having a memory 51 for storing data of is attenuation values of a power adjustment part 70; a frequency up-converting part 60 for converting the IF outputted from the digital/analog converting part 20 into ultra high frequency (UHF) according to the control of the radio frequency control part 50; a power adjustment part 70 for adjusting a power amplification rate according to the attenuation adjustment control signal of the radio frequency control part 50 so as to adjust the power of the up-converted data of the frequency up-converting part 60 to be gradually amplified; a power amplifying part 80 for amplifying power of the UHF in accordance with the power amplification rate of the power adjustment part 70; and a transmitting part 90 for performing bandpass filtering with respect to the signals amplified at the power amplifying part 80 to transmit only signals of a desired band.

The power adjustment part 70 includes: a digital to analog (D/A) converter 71 for converting the attenuation adjustment control signal of the radio frequency control part 50 into an analog signal and applying voltage to an attenuator 72; an attenuator 72 which is controlled to adjust an attenuation value according to the analog signal of the D/A converter 71, for adjusting the power amplification rate and transmitting the up-converted data from the frequency up-converting part 60 to the power amplifying part 80 so as to allow the power to be amplified in accordance with the adjusted power amplification rate; an analog to digital (A/D) converter 73 for reading and converting the attenuation value of the attenuator 72 into a digital signal before outputting it to the radio frequency control part 50; and a memory 74 for storing voltages and corresponding attenuation values which are data of the attenuator 72 in the form of a map.

The digital modulating part 10 receives coded voice information or data information and performs channel decoding and digital conversion, and band expanssion. The D/A converting part 20 converts a digital signal outputted from the digital modulating part 10 into an IF analog signal. The base station management part 30 overall manages various parameters used in the base station and performs state management and source loading. An operator can modify parameters when necessary via the base station management part 30. Accordingly, attenuation values of the attenuator in the power adjustment part 70 can be controlled via the base station management part 30.

The frequency up-converting part 60 converts the IF signal outputted from the D/A converting part 20 into a UHF signal according to the control of the radio frequency control part 50. The frequency up-converting part 60 up-converts the signal into a signal of 800 MHz band in a code division multiplexing access (CDMA) cellular system and into a frequency of 1.8 GHz (or 1.9 GHz) in a personal communication system (PCS). The power of an output signal of the frequency up-converting part 60 is changed in accordance with the attenuation value of the attenuator 72 in the power adjustment part 70 and this subsequently changes a transmission power of the power amplifying part 80 and a transmission power of the transmitting part 90.

The radio frequency control part 50 is provided with a function of reading the memory 74 embodied by an electrically erasable and programmable read only memory (EEPROM) in the power adjustment part 70 and a circuit and function of interfacing the D/A converter 71 and the A/D converter 73.

The following table shows an example of an attenuator 72 data table stored in the memory 74 in the power adjustment part 70.

TABLE 1 comparison between attenuator's voltages and attenuation values stored in the memory (unit: × 10 dB)

| voltage | 0.0 | 0.1 | 0.2 | 0.3 | 0.4 | 0.5 | 0.6 | 0.7 | 0.8 | 0.9 |
|---|---|---|---|---|---|---|---|---|---|---|
| 1 | 999 | 999 | 999 | 999 | 999 | 999 | 901 | 888 | 800 | 748 |
| 2 | 663 | 589 | 589 | 526 | 526 | 500 | 484 | 436 | 436 | 423 |
| 3 | 410 | 381 | 381 | 369 | 369 | 348 | 330 | 310 | 310 | 295 |
| 4 | 295 | 285 | 279 | 272 | 262 | 262 | 245 | 245 | 230 | 230 |
| 5 | 228 | 213 | 213 | 203 | 203 | 198 | 185 | 185 | 173 | 173 |
| 6 | 165 | 158 | 158 | 150 | 150 | 142 | 128 | 128 | 118 | 118 |
| 7 | 113 | 104 | 104 | 99 | 95 | 90 | 84 | 78 | 72 | 66 |
| 8 | 60 | 46 | 51 | 46 | 40 | 37 | 28 | 28 | 20 | 19 |
| 9 | 15 | 13 | 10 | 8 | 7 | 5 | 4 | 4 | 4 | 3 |
| 10 | 3 | 3 | 2 | 1 | 0 | 0 | 0 | 0 | 0 | 1 | where the unit of a voltage is a 1 Volt and the unit of an attenuation value is a 0.1 dB.

For example, if a voltage of 5.3 V is applied to the attenuator 72, a corresponding attenuation value is 20.3 dB. The unit of the voltage can be adjusted at an operator's discretion. The smaller unit of the voltage can be used for fine adjustment. All attenuators do not have the same data values, so this data is measured and stored in the memory 74 of the power adjustment part 70 in advance.

The radio frequency control part 50 reads the voltages and respective corresponding attenuation values which are the data values of the attenuator 72 from the memory 74 in the power adjustment part 70 and stores them in its memory 51. When it is intended to attenuate the power of an output signal of the frequency up-converting part 60 by 14 dB, the radio frequency control part 50 searches the data like the table 1 stored in its memory 51 and reads 6.5V corresponding to 14.2 dB which is closest to 14 dB from the data. Subsequently, the radio frequency control part 50 controls the D/A converter 71 so as to apply 6.5V to the attenuator 72. The radio frequency control part 50 in turn reads a voltage applied to the attenuator 72 via the A/D converter 73 and detects an attenuation value of the attenuator 72. For example, if the voltage of the attenuator 72 is 7.23V, the radio frequency control part 50 finds 7.2V which is the closest value to 7.23V in the data like the table 1 stored in the memory 51 and reads 10.4 dB which is a corresponding attenuation value. In this embodiment, the attenuator 72 is controlled via control of voltage, but the attenuator 72 can be controlled via control of something other than the voltage.

Hence, the power of the output signal of the power adjustment 70 is changed according to the attenuation value of the attenuator 72 and this change sequentially modifies the transmission power of the power amplifying part 80 and the transmission power of a front end (an end device in a transmitting unit) in the transmitting part 90. For example, if the attenuation value of the attenuator Is set to 10 dB, the end transmission power of the transmit front end is attenuated by 10 dB. When this attenuation by 10 dB is repeatedly performed, the transmission power is gradually attenuated 10 dB at a time. When controlling the base station transmitted forward power, a power amplification rate can be increased or decreased by subtracting/adding an attenuation width from/to the attenuation value of the attenuator according to the activation, partial activation, or inactivation mode. The power amplification rate of the power amplifying part 80 is then gradually increased or decreased by a rate of the attenuation width. Consequently, the power of the UHF signal inputted to the power amplifying part 80 is gradually amplified and the transmitting part 90 performs bandpass filtering with respect to the amplified UHF signal to transmit only a signal of a necessary band.

Figure 3:
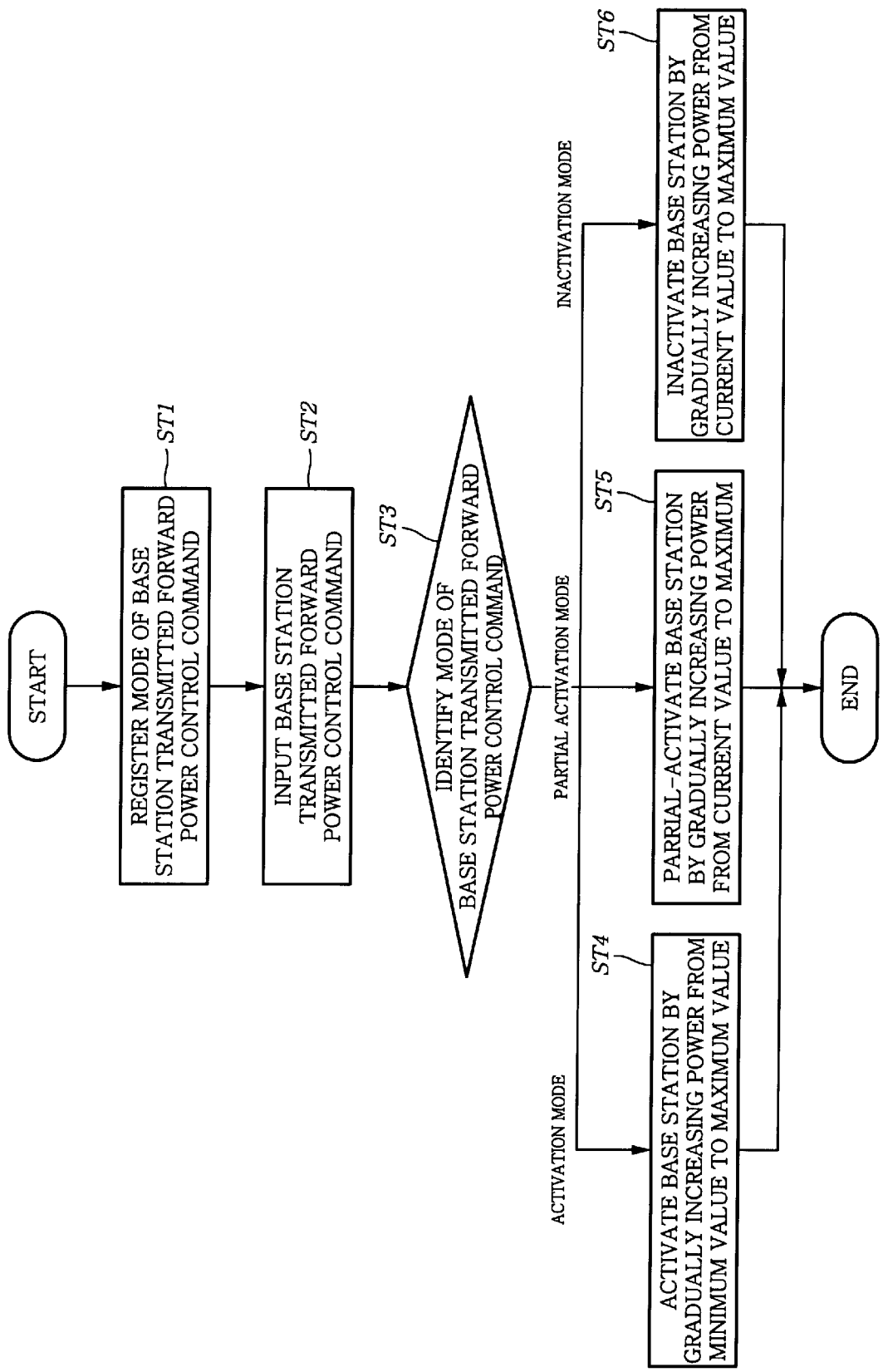
FIG. 3 is a flow chart of a method of controlling a base station transmitted forward power in a mobile communication system according to the present invention.

FIG. 3 is a flow chart of a method of controlling a base station transmitted forward power in a mobile communication system according to the present invention.

As shown in FIG. 3, the method comprises the steps of: registering the activation, partial activation, and inactivation mode in a mode of a base station transmitted forward power control command (ST1); once the base station transmitted forward power control command is inputted (ST2), identifying the mode of the base station transmitted forward power control command (ST3); when the identified forward power control command mode is the base station activation mode, gradually increasing a transmission power from a minimum value to a maximum value by controlling an attenuation value of the attenuator 72, thus activating a base station (ST4); when the identified forward power control command mode is the base station partial activation mode, gradually increasing the transmission power from a current value to the maximum value by controlling the attenuation value of the attenuator 72, thus partial-activating the base station (ST5); and when the identified forward power control command mode is the base station inactivation mode, gradually decreasing the transmission power from the current value to the minimum value by controlling the attenuation value of the attenuator 72, thus inactivating the base station (ST6).

Specifically, the base station management part 30 registers an activation, a partial activation, and an inactivation modes in a mode of a base station transmitted forward power control command (ST1). Once the base station transmitted forward power control command is inputted to the base station management part 30 (ST2), the base station management part 30 identifies the mode of the base station transmitted forward power control command (ST3).

According to a result of identifying the mode of the base station transmitted forward power control command, the following operations are performed.

When the mode of the base station transmitted forward power control command is the base station activation mode, the base station management part 30 controls the radio frequency control part 50 so as to operate according to the activation mode. Accordingly, the radio frequency control part 50 controls an attenuation value of the attenuator 72 to gradually increase a transmission power from a minimum value to a maximum value, thereby activating a base station (ST4).

When the mode of the base station transmitted forward power control command is the base station partial activation mode, the radio frequency control part 50 controls an attenuation value of the attenuator 72 to gradually increase transmission power from a current value to a maximum value, thereby partial-activating a base station (ST5).

When the mode of the base station transmitted forward power control command is the base station inactivation mode, the radio frequency control part 50 controls an attenuation value of the attenuator 72 to gradually decrease a transmission power from a current value to a minimum value, thereby inactivating a base station (ST6).

Figure 4:
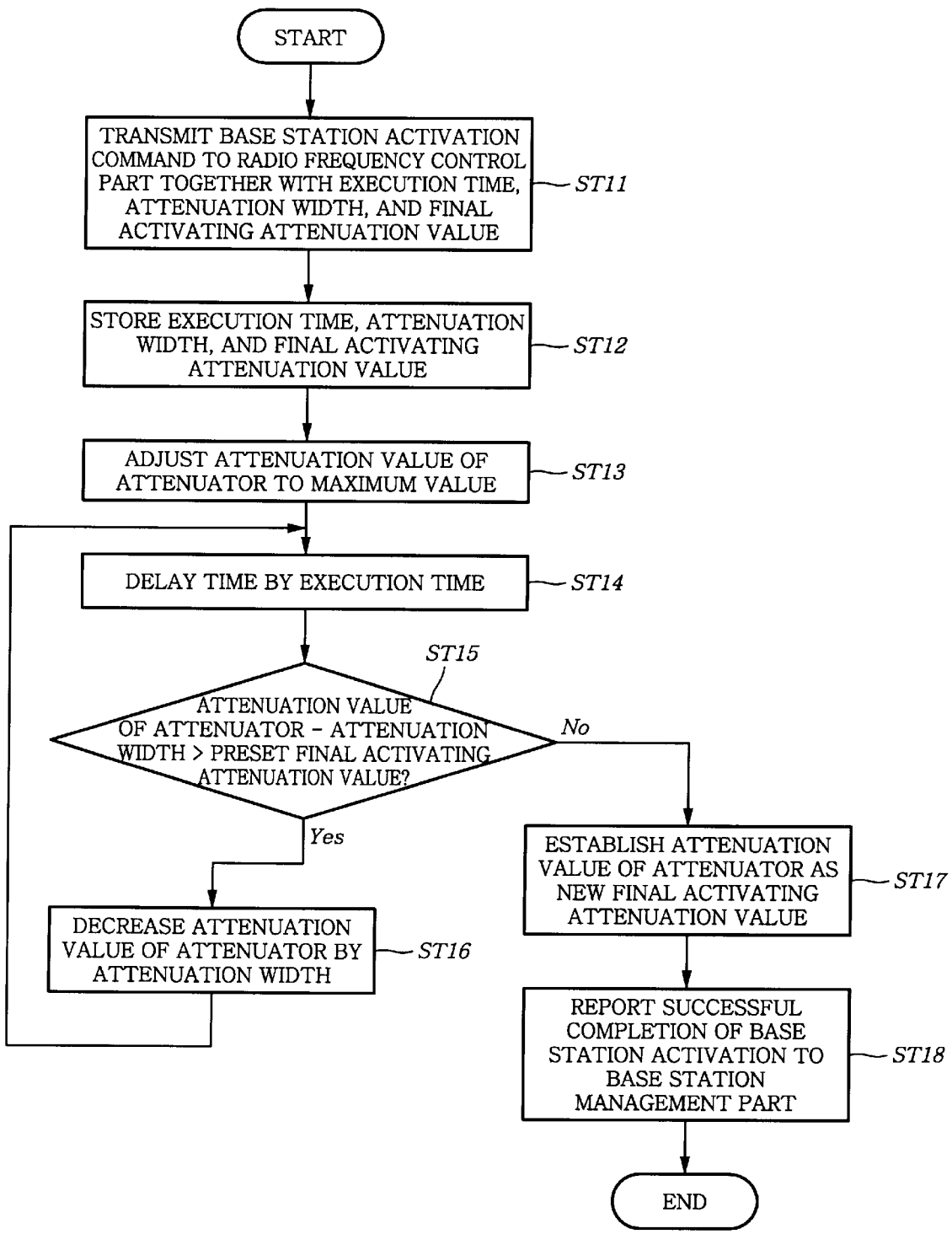
FIG. 4 is a flow chart showing operations in a base station activation mode according to the forward power control method depicted in FIG. 3.

FIG. 4 is a flow chart showing processes in the base station activation mode according to the forward power control method depicted in FIG. 3.

As shown in FIG. 4, the processes for the base station activation mode comprise the steps of: setting an execution time, an attenuation width, and a final activating attenuation value and transmitting the base station activation command to the radio frequency control part 50 via the base station control part (ST11; storing the preset execution time, attenuation width, and final activating attenuation value in the memory 51 of the radio frequency control part 50, adjusting the attenuation value of the attenuator 72 in the power adjustment 70 to the maximum value according to the base station activation command, and delaying time by the preset execution time (ST12 to ST14); after time delay by the execution time, comparing a value obtained by subtracting the set attenuation width from the current attenuation value of the attenuator 72 with the preset final activating attenuation value (ST15); when the value obtained by subtracting the attenuation width from the current attenuation value of the attenuator 72 exceeds the preset final activating attenuation value, reducing the attenuation value of the attenuator 72 by the attenuation width and going back to the step of delaying the time by the execution time (ST16); and when the value obtained by subtracting the preset attenuation width from the current attenuation value of the attenuator 72 is equal to or less than the preset final activating attenuation value, adjusting the attenuation value of the attenuator to the obtained, subtracted value to establish the subtracted attenuation value as a new final activating attenuation value and reporting to the base station management part 30 that the base station activation has been successfully effected by gradual increase of the transmission power (ST17 and ST18).

The forward power control apparatus at the base station operates as follows in the base station activation mode of the forward power control mode.

Primarily, an operator sets an execution time, an attenuation width, and a final activation attenuation value via the base station management part 30 and sends a base station activation command to the radio frequency control part 50 via the base station control part 40. The execution time is a time interval necessary for the radio frequency control part 50 to adjust an attenuation value of the attenuator. The attenuation width is an extent of attenuation which is always applied in order to adjust the attenuation value of the attenuator 72 when the radio frequency control part 50 realizes the attenuation value of the attenuator 72. The final activating attenuation value is a finally desired attenuation value of the attenuator 72 when activating the base station (ST11).

Subsequently, the radio frequency control part 50 stores the set execution time, attenuation width, and final activating attenuation value received from the base station management part 30 in its memory 51 (ST12).

In response to the base station activation command, the radio frequency control part 50 generates a digital attenuation adjustment control signal via the D/A converter 71 to control the attenuator 72 to have a maximum attenuation value. The attenuator 72 sets its attenuation value to the maximum in response to the attenuation adjustment control signal which has been converted into an analog signal at the D/A converter 71. When the attenuation value is maximized, an attenuation rate becomes minimized, so the up-converted UHF signal of the frequency up-converting part 60 transmitted via the attenuator 72 to the power amplifying part 80 is minimum-amplified. The transmitting part 90 outputs a transmission power which has been minimum-amplified in accordance with applied voltage. The transmission power of the base station at this time has a minimum value, so it is weak (ST13).

After a certain time (the preset execution time), the radio frequency control part 50 reads the attenuation value of the attenuator 72 via the A/D converter 73 and compares a value obtained by subtracting the set attenuation width from the current attenuation value of the attenuator 72 with the final activating attenuation value which has been preset and stored in the memory 51 (ST14 and ST15).

When the value obtained by subtracting the set attenuation width from the current attenuation value of the attenuator 72 exceeds the preset final activating attenuation value, the radio frequency control part 50 controls such that the attenuation value of the attenuator 72 is reduced by the set attenuation width and, after the predetermined certain time, newly compares a value obtained by subtracting the set attenuation width from a current attenuation value of the attenuator 72 with the final activating attenuation value. This comparison is performed based upon the comparison table of voltages and corresponding attenuation values which the radio frequency control part 50 reads from the memory 74 in the power adjustment part 70 and stores in its memory 51. Once the attenuation value of the attenuator is reduced by the attenuation width, the attenuator 72 increases a power amplification rate by decrement of the attenuation value and transmits the output signal of the frequency up-converting part 60 to the power amplifying part 80. The signal is amplified by the increased power amplification rate at the power amplifying part 80 and forwarded via the transmitting part 90 (ST16).

After repeatedly performing these operations, when a value obtained by subtracting the set attenuation width from a current attenuation value is equal to or less than the set final activating attenuation value, the radio frequency control part 50 controls such that the current attenuation value of the attenuator 72 is established as a new final activating attenuation value based upon the voltage and attenuation value comparing table stored in the memory 51. The power adjustment part 70 then adjusts the power amplification rate according to the new final activating attenuation value of the attenuator 72 and transmits the data from the frequency up-converting part 60 to the power amplifying part 80. The power amplifying part 80 amplifies the power up to a final forward power control level and then outputs it via the transmitting part 90 (ST17).

The radio frequency control part 50 reports via the base station control part 40 to the base station management part 30 that the base station activation has been successfully performed by gradual increase of the transmission power through the above processes when in the forward power control (ST18).

In the activation mode of the base station transmitted forward power control mode, a mobile station is influenced little by little by a power interference of a base station to be activated, so a base station which is adjacent to the base station to be activated and has the mobile station in its coverage area can prevent interruption of a call of the mobile station through the above forward power control. In other words, when performing the forward power control using a signal-noise ratio (S/N), a mobile station is gradually influenced by the noise of an adjacent base station which is being activated, so a base station which is adjacent to the base station to be activated and has the mobile station in its coverage area has enough chances to properly increase the forward power to the mobile station in order to satisfactorily eliminate the influence of the noise, thus solving an instability problem resulting from the interruption of calls during a mobile communication service.

Figure 5:
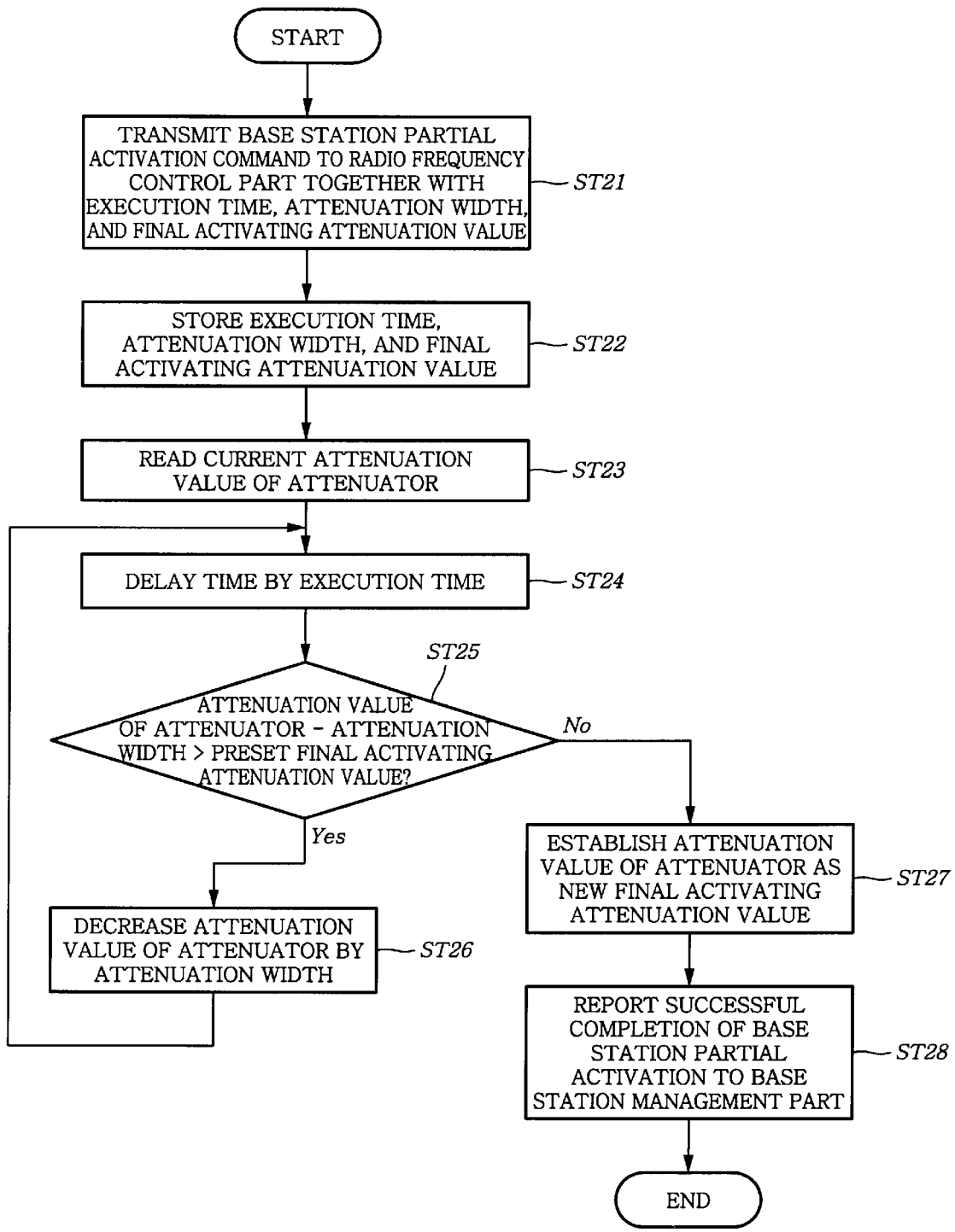
FIG. 5 is a flow chart showing operations in a base station partial activation mode according to the forward power control method depicted in FIG. 3.

FIG. 5 is a flow chart showing processes in the base station partial activation mode according to the forward power control method depicted in FIG. 3.

As shown in FIG. 5, the processes comprise the steps of: setting an execution time, an attenuation width, and a final activating attenuation value and transmitting a base station partial activation command to the radio frequency controlling part 50 via the base station control part (ST21); storing the set execution time, attenuation width, and final activating attenuation value in the memory 51 of the radio frequency control part 50, going to the partial activation mode according to the base station partial activation command, reading a current attenuation value of the attenuator 72 in the power adjustment 70, and delaying time by the preset execution time (ST22 to ST24); after the time delay by the execution time, comparing a value obtained by subtracting the preset attenuation width from the read current attenuation value of the attenuator 72 with the preset final activating attenuation value (ST25); when the value obtained by subtracting the preset attenuation width from the current attenuation value of the attenuator 72 exceeds the preset final activating attenuation value, reducing the current attenuation value of the attenuator 72 by the preset attenuation width and going back to the step of delaying the time by the execution time (ST26); and when the value obtained by subtracting the preset attenuation width from the current attenuation value of the attenuator 72 is equal to or less than the preset final activating attenuation value, adjusting the current attenuation value of the attenuator 72 to the obtained value through the subtraction so as to establish the obtained, subtracted attenuation value as a new final activating attenuation value and reporting to the base station management part 30 that the base station partial activation has been successfully effected by gradual increase of the transmission power (ST27 and ST28).

The following description concerns operations at the base station partial activation mode in controlling the base station transmitted forward power.

Primarily, an operator sets an execution time, an attenuation width, and a final activating attenuation value via the base station management part 30 and sends a base station partial activation command to the radio frequency control part 50 via the base station control part 40. The execution time, attenuation width, and final activating attenuation value have the same definitions as those in the base station activation mode (ST21).

Subsequently, the radio frequency control part 50 stores the set execution time, attenuation width, and final activating attenuation value received from the base station management part 30 in its memory 51, goes into the partial activation mode in response to the base station partial activation command, and, in turn, reads a current attenuation value of the attenuator 72 via the D/A converter 71 and A/D converter 73 (ST22 and ST23).

After a certain time (execution time which has been preset), the radio frequency control part 50 stores the voltages and attenuation values comparing table stored in the memory 74 in the power adjustment part 70 in its memory 51 and reads the table from the memory 51. The radio frequency control part 50 also reads a current attenuation value of the attenuator 72 via the A/D converter 73 and then compares a value obtained by subtracting the preset attenuation width from the current attenuation value of the attenuator 72 with the preset final activating attenuation value (ST24 and ST25).

When the value obtained by subtracting the preset attenuation width from the current attenuation value exceeds the preset final activating attenuation value, the radio frequency control part 50 controls the attenuator 72 via the D/A converter 71 such that the current attenuation value is reduced by the preset attenuation width. The power adjustment part 70 increases a power amplification rate by decrement of the attenuation value of the attenuator 72 and, in turn, transmits the output signal of the frequency up-converting part 60 to the power amplifying part 80. The signal is amplified by the increased power amplification rate at the power amplifying part 80 and forwarded via the transmitting part 90 (ST26). After the predetermined certain time, the radio frequency control part 50 newly compares a value obtained by subtracting the preset attenuation width from a current attenuation value of the attenuator 72 with the final activating attenuation value.

After repeatedly performing these operations, when the value obtained by subtracting the preset attenuation width from a current attenuation value is equal to or less than the preset final activating attenuation value, the radio frequency control part 50 controls such that the current attenuation value of the attenuator 72 is established as a new final activating attenuation value. The power adjustment part 70 then adjusts a power amplification rate according to the final activating attenuation value of the attenuator, 72 and transmits the data from the frequency up-converting pare 60 to the power amplifying part 80. The power amplifying part 80 amplifies the power up to a final forward power control level and then outputs it via the transmitting part 90 (ST27).

The radio frequency control part 50 reports via the base station control part 40 to the base station management part 30 that the base station partial activation has been successfully performed by gradually increasing the transmission power from a current power value to a maximum value of the attenuator 72 at the base station through the above processes (ST28).

Figure 6:
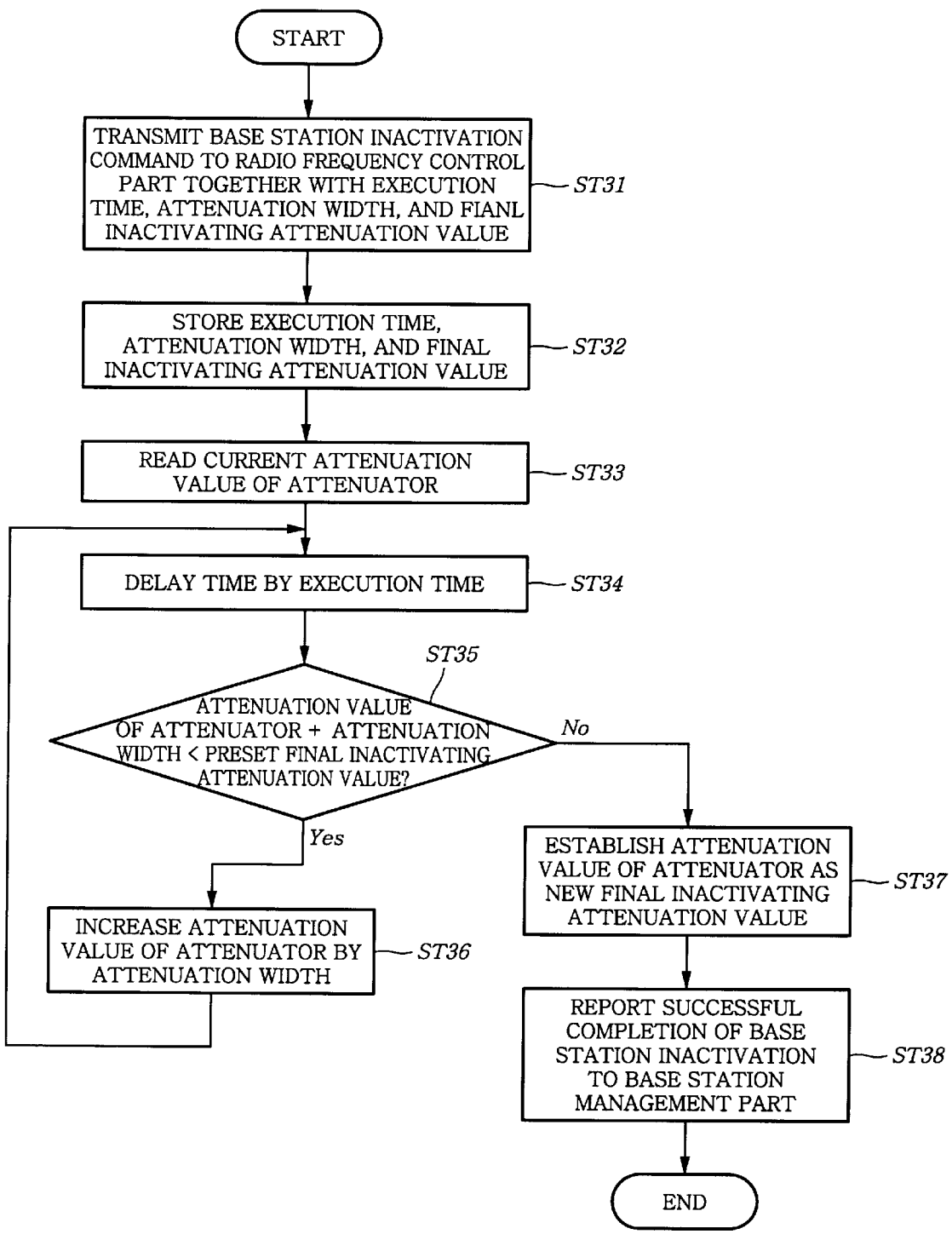
FIG. 6 is a flow chart showing operations in a base station inactivation mode according to the forward power control method depicted in FIG. 3.

FIG. 6 is a flow chart showing operations in a base station inactivation mode according to the forward power control method depicted in FIG. 3.

As shown in FIG. 6, the procedure for the base station inactivation mode comprises the steps of: setting an execution time, an attenuation width, and a final inactivating attenuation value and transmitting a base station inactivation command to the radio frequency control part 50 via the base station control part (ST31); storing the set execution time, attenuation width, and final inactivating attenuation value in the memory 51 of the radio frequency control part 50, reading a current attenuation value of the attenuator 72 in the power adjustment 70 according to the base station inactivation command, and delaying time by the preset execution time (ST32 to ST34); after the time delay by the execution time, comparing a value obtained by adding the preset attenuation width to the read current attenuation value of the attenuator 72 with the preset final inactivating attenuation value (ST35); when the value obtained by adding the preset attenuation width to the current attenuation value of the attenuator 72 is less than the preset final inactivating attenuation value, increasing the current attenuation value of the attenuator 72 by the preset attenuation width and going back to the step of delaying the time by the execution time (ST36); and, when the value obtained by adding the preset attenuation width to the current attenuation value of the attenuator 72 is equal to or greater than the preset final inactivating attenuation value, adjusting the attenuation value of the attenuator 72 to the obtained value through the adding operation so as to establish the obtained, added attenuation value as a new final inactivating attenuation value and reporting to the base station management part 30 that the base station inactivation has been successfully effected by gradual reduction of the transmission power (ST37 and ST38).

The following description concerns operations at the base station inactivation mode in the forward power control for the base station.

Primarily, an operator sets the execution time, the attenuation width, and the final inactivation attenuation value via the base station management part 30 and sends the base station inactivation command to the radio frequency control part 50 via the base station control part 40. The execution time is a time interval necessary for the radio frequency control part 50 to adjust the attenuation value of the attenuator 72. The attenuation width is an extent of attenuation which is always applied in order to adjust the attenuation value of the attenuator 72 when the radio frequency control part 50 realizes the attenuation value of the attenuator 72. The final inactivation attenuation value is a finally desired attenuation value of the attenuator 72 when inactivating the base station (ST31).

After a certain time (execution time which has been set, the radio frequency control part 50 compares a value obtained by adding the set attenuation width to the current attenuation value of the attenuator 72 with the preset final inactivation attenuation value (ST34 and ST35). When the value obtained by adding the set attenuation width to the current attenuation value is less than the preset final inactivation attenuation value, the radio frequency control part 50 controls the attenuator 72 via the D/A converter 71 such that the attenuation value is increased by the set attenuation width. The frequency up-converting part 65 reduces a frequency up-converting rate by increment of the attenuation value of the attenuator 72 and, in turn, transmits the data from the D/A converting part 20 to the power amplifying part 80. The power amplifying part 80 amplifies the power which has been decreased by the increment of the attenuation value (ST36). After the predetermined certain time, the radio frequency control part 50 newly compares a value obtained by adding the set attenuation width to a current attenuation value of the attenuator 72 with the final inactivation attenuation value.

When the value obtained by adding the set attenuation width to the current attenuation value is equal to or greater than the set final inactivation attenuation value, the radio frequency control part 50 controls the attenuator 72 via the D/A converter 71 to set the attenuation value to the preset final inactivation attenuation value. The power adjustment part 70 then adjusts the frequency up-converting rate according to the final inactivation attenuation value of the attenuator 72, thereby effecting the base station inactivation. If the base station inactivation is susessfully performed through such processes, the radio frequency control part 50 reports the successful result of the inactivation to the base station management part 30 (ST37 and ST38).

Since the base station is inactivated by gradually reducing the transmission power, a mobile station within in the coverage area of the base station to be inactivated can be taken over by an adjacent base station, thereby effecting handoff without interruption of a call.

As illustrated, the present invention gradually activates, inactivates, or partially activates a base station when a mobile communication switching system controls a forward power for the base station, thereby providing continuous mobile communication services without interruption of calls.

In this embodiment of the present invention, the mobile communication switching system is described in detail, but this invention can be applied to mobile cellular telecommunications using a CDMA mode, the PCS, and satellite communications for the control of the base station transmitted forward power.

According to a method for controlling a base station transmitted forward power in a mobile communication system of the present invention, a radio frequency control part controls a power adjustment part to adjust an attenuation value to gradually increase or decrease a transmission power in the mobile communication system in use, thus minimizing noise affection on a mobile station, thereby effectively performing the forward power control of a base station without deterioration of speech quality of the mobile station in use or interruption of a call.

It will be apparent to those skilled in the art that various modifications and variations can be made in an apparatus and method for controlling a base station transmitted forward power in a mobile communication system of the present invention without deviating from the spirit or scope of the invention. Thus, it is intended that the present invention cover the modifications and variations of this invention provided they come within the scope of the appended claims and their equivalents.

What is claimed is:

1. An apparatus for controlling a base station transmitted forward power in a mobile communication system, the apparatus having a frequency up-converting part for converting intermediate frequency signals into ultra high frequency (UHF) signals and a power amplifying part for amplifying a power of the UHF signals, the apparatus comprising:

a radio frequency control part for controlling up-conversion of frequency and generating a control signal for adjustment of an attenuation value, said radio frequency control part having a memory for storing data of attenuation values of a power adjustment part; and a power adjustment part for adjusting a power amplification rate so as to gradually amplify a power of up-converted data of said frequency up-converting part according to the attenuation adjustment control signal of said radio frequency control part and transmitting the data from said frequency up-converting part to said power amplifying part.

2. An apparatus according to claim 1, wherein said power adjustment part comprises:

a digital to analog (D/A) converter for converting said attenuation adjustment control signal of said radio frequency control part into an analog signal and applying voltage to an attenuator;

an attenuator which is controlled to have an attenuation value adjusted according to said analog signal of said D/A converter, for adjusting the power amplification rate an transmitting the up-converted data from said frequency up-converting part to said power amplifying part so as to allow the power to be amplified in accordance with said power amplification rate adjusted;

an analog to digital (A/D) converter for reading and converting the attenuation value of said attenuator into a digital signal before outputting it to said radio frequency control part; and a memory for storing voltages and corresponding attenuation values which are data of said attenuator in the form of a map.

3. A method of controlling a base station transmitted forward power in a mobile communication system, for controlling a base station transmitted forward power controlling apparatus which includes a power adjustment part for adjusting a power amplification rate to make the power be gradually amplified and transmitting data from a frequency up-converting part to a power amplifying part, the method comprising the steps of:

(a) registering an activation, a partial activation, and an inactivation modes in a mode of a base station transmitted forward power control command;

(b) once the base station transmitted forward power control command is inputted, identifying the mode of said base station transmitted forward power control command; and (c) controlling an attenuation value of an attenuator in said power adjustment part according to a result of identifying said forward power control command mode so as to gradually increase or decrease a base station transmitter power, thereby effecting the base station transmitted forward power control.

4. A method according to claim 3, wherein said controlling step (c) comprises:

activation mode performing step of gradually increasing a transmission power from a minimum value to a maximum value by controlling the attenuation value of said attenuator when said forward power control command mode is identified as the base station activation mode, thus activating the base station;

partial activation mode performing step of gradually increasing a transmission power from a current value to a maximum value by controlling the attenuation value of said attenuator when said forward power control command mode is identified as the base station partial activation mode, thus partial-activating the base station; and inactivation mode performing step of gradually decreasing a transmission power from a current value to a minimum value by controlling the attenuation value of said attenuator when said forward power control command mode is identified as the base station inactivation mode, thus inactivating the base station.

5. A method according to claim 4, wherein said activation mode performing step comprises the steps of:

setting an execution time, an attenuation width, and a final activating attenuation value through a base station management part and transmitting a base station activation command to a radio frequency control part;

storing said set execution time, attenuation width, and final activating attenuation value in a memory of said radio frequency control part, adjusting the attenuation value of said attenuator to the maximum value according to said base station activation command, and delaying time by said preset execution time;

after the time delay by said execution time, comparing a value obtained by subtracting said preset attenuation width from the current attenuation value of said attenuator with said preset final activating attenuation value;

when said value obtained by subtracting said preset attenuation width from said current attenuation value of said attenuator exceeds said preset final activating attenuation value, reducing said current attenuation value of said attenuator by said preset attenuation width and going back to said step of delaying the time by said execute on time; and when said value obtained by subtracting said preset attenuation width from said current attenuation value of said attenuator is equal to or less than said preset final activating attenuation value, adjusting said attenuation value of said attenuator to said value obtained through the subtraction, establishing said obtained attenuation value as a new final activating attenuation value, and reporting to said base station management part that the base station activation has been successfully effected through gradual increase of the transmission power.

6. A method according to claim 4, wherein said partial activation mode performing step comprises the steps of:

setting an execution time, an attenuation width, and a final activating attenuation value through a base station management part and transmitting a base station partial activation command to a radio frequency control part;

storing said set execution time, attenuation width, and final activating attenuation value in a memory of said radio frequency control part, going to the partial activation mode according to said base station partial activation command and reading a current attenuation value of said as attenuator, and delaying time by said set execution time;

after the time delay by said execution time, comparing a value obtained by subtracting said set attenuation width from said current attenuation value of said attenuator with said set final activating attenuation value;

when said value obtained by subtracting said set attenuation width from said current attenuation value of said attenuator exceeds said set final activating attenuation value, reducing said attenuation value of said attenuator by said set attenuation width and going back to said step of delaying the time by said execution time; and when said value obtained by subtracting said set attenuation width from said current attenuation value of said attenuator is equal to or less than said set final activating attenuation value, adjusting said attenuation value of said attenuator to said value obtained through the subtraction, establishing said obtained value as the final activating attenuation value, and reporting to said base station management part that the base station partial activation has been successfully effected through gradual increase of the transmission power.

7. A method according to claim 4, wherein said inactivation mode performing step comprises the steps of:

setting an execution time, an attenuation width, and a final inactivating attenuation value and transmitting a base station inactivation command to a radio frequency control part;

storing said set execution time, attenuation width, and final inactivating attenuation value in a memory of said radio frequency control part, reading a current attenuation value of said attenuator according to said base station inactivation command, and delaying time by said set execution time;

after the time delay by said execution time, comparing a value obtained by adding said set attenuation width to said current attenuation value of said attenuator with said set final inactivating attenuation value;

when said value obtained by adding said set attenuation width to said current attenuation value of said attenuator is less than said set final inactivating attenuation value, increasing said attenuation value of said attenuator by said set attenuation width and going back to said step of delaying the time by said execution time; and when said value obtained by adding said set attenuation width to said current attenuation value of said attenuator is equal to or greater than said set final inactivating attenuation value, adjusting said attenuation value of said attenuator to said value obtained through the adding, establishing said obtained value as a new final inactivating attenuation value, and reporting to said base station management part that the base station inactivation has been successfully effected through gradual reduction of the transmission power.

* * * * *